United States Patent [19]

Kudlacik

[11] Patent Number: 5,329,197

[45] Date of Patent: Jul. 12, 1994

[54] GENERATOR ROTOR WINDING WITH TWO COILS PER SLOT

[75] Inventor: Henry W. Kudlacik, Schenectady, N.Y.

[73] Assignee: General Electric Company, Schenectady, N.Y.

[21] Appl. No.: 968,329

[22] Filed: Oct. 29, 1992

[51] Int. Cl.$^5$ ............................................. H02K 3/00
[52] U.S. Cl. ................................. 310/198; 310/61; 310/208; 310/214; 310/215
[58] Field of Search ................ 310/52, 54, 60 A, 61, 310/64, 65, 214, 215, 198, 208, 270, 261, 45

[56] References Cited

U.S. PATENT DOCUMENTS

| | | | |
|---|---|---|---|
| 1,819,860 | 8/1931 | Belfils | 310/61 UX |
| 2,844,746 | 7/1958 | Coggeshall | 310/65 |
| 2,962,613 | 11/1960 | Maher | 310/208 |
| 3,119,033 | 1/1964 | Horsley | 310/64 |
| 3,154,706 | 10/1964 | Richardson | 310/54 |
| 3,431,639 | 3/1969 | Reimer | 310/215 UX |
| 3,677,330 | 7/1972 | Maximovich et al. | 164/108 |
| 3,831,268 | 8/1974 | Boyd et al. | 29/598 |
| 4,255,849 | 3/1981 | Beck et al. | 29/599 |
| 4,308,476 | 12/1981 | Schuler | 310/45 |
| 4,321,498 | 3/1982 | Vogt | 310/215 |
| 4,328,437 | 5/1982 | Inticbar | 310/52 |
| 4,394,594 | 7/1983 | Schmider et al. | 310/68 R |
| 4,572,980 | 2/1986 | Anderson et al. | 310/214 |
| 4,843,271 | 6/1989 | Shah | 310/217 |
| 4,859,891 | 8/1989 | Jenkins et al. | 310/215 |
| 4,876,469 | 10/1989 | Khutoretsky | 310/52 |
| 4,888,508 | 12/1989 | Adam et al. | 310/42 |
| 4,900,956 | 2/1990 | Gavilondo | 310/61 |
| 4,956,910 | 9/1990 | Banner et al. | 29/593 |
| 5,065,064 | 11/1991 | Kaminski | 310/215 |
| 5,140,204 | 8/1992 | Cashmore | 310/61 |
| 5,172,396 | 12/1992 | Emery | 310/208 |

Primary Examiner—R. Skudy
Attorney, Agent, or Firm—Nixon & Vanderhye

[57] ABSTRACT

Two coil windings per slot are disposed in a dynamo-electric machine rotor. The coil winding conductors are stacked on the sides of the rotor slots with the central coil sides separated by a plurality of insulating spacers driven between them in a radial direction and with the spacers distributed in the axial direction along the rotor slots such that radial ventilating passages are formed by the sides of the spacers and coil conductors. Coolant gases enter the slots axially below the coils and progress radially through the ventilating passages as well as the slot creepage block and wedge and discharges from the rotor into the stator-rotor air gap.

7 Claims, 3 Drawing Sheets

GENERATOR ROTOR WINDING WITH TWO COILS PER SLOT

This invention was made with United States Government support under a contract with the United States Navy. The federal government has certain rights in this invention.

TECHNICAL FIELD

The present invention relates to improvements in rotor windings for use in ventilated dynamoelectric machine rotors.

BACKGROUND

Conventional dynamoelectric machines, such as generators used with gas and steam turbine drives employ forged rotors of magnetic material into which slots are machined for receiving the conductive turns of field windings which are interconnected so as to produce a desired magnetic flux pattern. The rotor may be pedestal mounted so as to be rotated on an axis to cause the flux pattern to interact with stator windings such that electric power is generated in response to the rotation supplied by a turbine or other motive device or a rotational torque is generated responsive to input electrical energy.

FIG. 1 is illustrative of a conventional generator rotor 1 constructed of a single-piece forging having coil slots 2, winding retainer rings 3, a fan 4 for stator winding ventilation, as well as shaft bearing surfaces and couplings.

The rotor windings are conventionally directly cooled by way of a radial flow design of coolant gases through openings in the winding conductors and insulating layers. Such coolant gas is supplied via subslots in the rotor winding slots wherein the coolant gases move axially through the subslots and radially through the winding flow channels. The manner in which the rotor slots are shaped and insulated, as well as the efficiency of the flow channels for eliminating heat from the windings present formidable space utilization design problems, particularly where high maximum permissible current limits are contemplated. Additionally, design considerations involve obtaining sufficient clearance for ventilation passages along with relatively high winding slot fill factors as well as insulating the individual winding turns from each other and from the rotor forging.

In this regard, FIG. 2 illustrates the present conventional practice of including one coil per slot wherein the coil turn conductors 20 are nearly the full width of the slot with only sufficient coil installation clearance between conductors and the forging to allow the inclusion of slot armor 21 to be used for insulating the turns from the rotor forging. Additionally, turn insulation 22 in the form of insulating strips are used between each turn conductor for insulating the individual winding turns from each other.

Such conventional slot configurations, as illustrated in U.S. Pat. No. 4,859,891 issued to Jenkins et al on Aug. 22, 1989, may include a U-shaped subslot liner for supporting the coil turn conductor 20, which in combination with a single U-shaped slot armor or two L-shaped portions of slot armor serve to support and insulate the turns from the metal rotor forging. Additionally included in such conventional rotor slots are creepage blocks 26 at both the top and bottom ends of the slot (only one of which is illustrated in FIG. 2), as well as dovetail wedges 24 for resisting the radially outward forces exerted on the windings when the rotor is operational. Further illustrated elements include radially directed passages 25 which are punched or machined slots in each of the winding turns, as well as the turn insulation, for providing radial ventilation passages. The U-shaped subslot liner 23 and the lower winding turn or creepage block provide an axial channel or subslot for furnishing a supply of coolant gas, such as air, to each of the ventilating passages or slots in the winding turns and turn insulation so as to provide high velocity gas, thus cooling the copper winding turns.

Still other slot configurations with relatively narrow machined subslots using subslot covers for supporting the winding turns are known, as may be seen from the disclosure in the aforementioned Jenkins et al patent. Still another approach may be seen from a review of U.S. Pat. No. 5,065,064 issued to Kaminski on Nov. 12, 1991, wherein the rotor slot insulation includes two insulating slot armors, each of which extends in an offset manner through the transition between the rotor slot and subslot, thus eliminating the need for a subslot cover.

In each of the above referenced configurations the slots, subslots, windings and insulation extend the full length of the rotor. Coolant gas enters through the full length subslots and is discharged into the air gap between rotor and stator along the length of the rotor body through radial slots that are machined or punched in the copper coil turn conductors, turn insulation, creepage blocks and wedges. As aforementioned, present design practice involves the use of one coil per rotor slot wherein the copper coil turn conductors are nearly the full width of the slot. As illustrated in FIG. 3, such full width slot coil turn conductors 30 separated by turn insulation strips 31 are formed into coils by brazing straight rectangular copper sections to them at their ends. The thus formed coils are inserted into a slot 32 after brazing and cleaning. Aligned ventilating slots such as 33, for example, may be included in both the copper coil turn conductors and insulating turn separators to allow the radial flow of coolant gases. Additionally, lateral grooves 34 may be included in the end turns to allow the circumferential flow of coolant gases.

I have discovered that the use of two coils per slot wherein the central coil sides are separated by insulating spacers driven between the coils after they are wound offers several advantages in the construction, operation and repair of such dynamoelectric machines. That is to say, the separation of the coils by a plurality of spacers distributed in a spaced relationship along the axial length of the rotor slots not only serves to electrically insulate the coils from each other but additionally form ventilating passages between the coil sides and spacers for allowing the radial flow of coolant gases. Additionally, the spacing between the two coils allows the coils to be forced away from the slot armor, thus allowing the replacement of damaged slot armor insulation. Moreover, after the insulating spacers are driven in place, no clearance exists between the rotor slot sidewalls, the slot armor and the coil sides, thus heat transfer from the copper coil turns to the steel rotor forging will increase resulting in lower copper temperatures. A further advantage of the disclosed structure is that the reduction in slot side clearance allows increased ventilation passage size or results in a better slot fill factor.

Still further advantages may be realized by my winding design. For example, since the coil turns are approximately half the normal width, they may be wound in place from a long length of conductor. Such winding would have the advantage of eliminating the brazing and cleaning of the aforementioned fabricated rotor windings even in the event that the increased stresses produced by winding the coils in place resulted in damaged slot armor. As aforementioned, the slot armor could be easily replaced without removing the coil from the slot. Moreover, although in some known indirectly cooled single full width coil rotor designs the coil end turns are formed by bending rather than the aforementioned brazing, relatively large upsets occur at the corners due to the bending of the rather wide full width coil turn conductors. Such upsets or dimensional irregularities in turn require pressing and/or grinding to eliminate the upsets. In contrast, where two coils are wound in the same slot bending of the relatively narrow coil conductors results in much less upset or dimensional irregularities in the half width conductors. Thus, only pressing may be required.

Additionally, it will be noted from the detailed description of the invention which follows, that the ability to install slot armor in the slot sides adjacent to the rotor poles after the coils are in place allows the distance between the ends of the rotor forging and the nearest end turn winding to be reduced. Thus, a reduction in effective rotor length or a relative increase in active machine length may be obtained.

These and further objectives and advantages of the present invention will become more apparent upon reference to the following specification, appended claims and drawings.

DETAILED DESCRIPTION OF THE DRAWINGS

Figure 2:
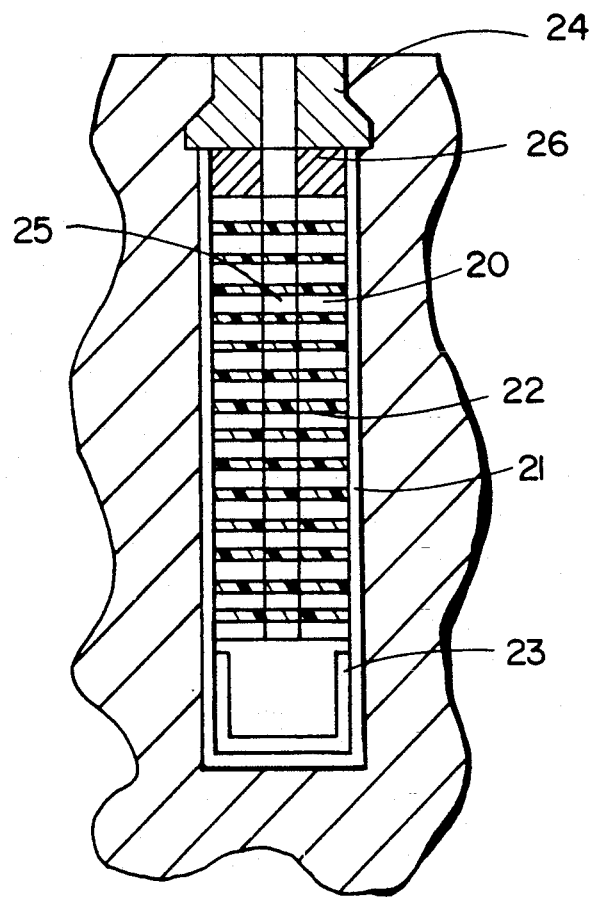
FIG. 2 is a cross-sectional view of a dynamoelectric rotor slot along with windings, insulation and ventilation elements in accordance with the prior art.
Figure 3:
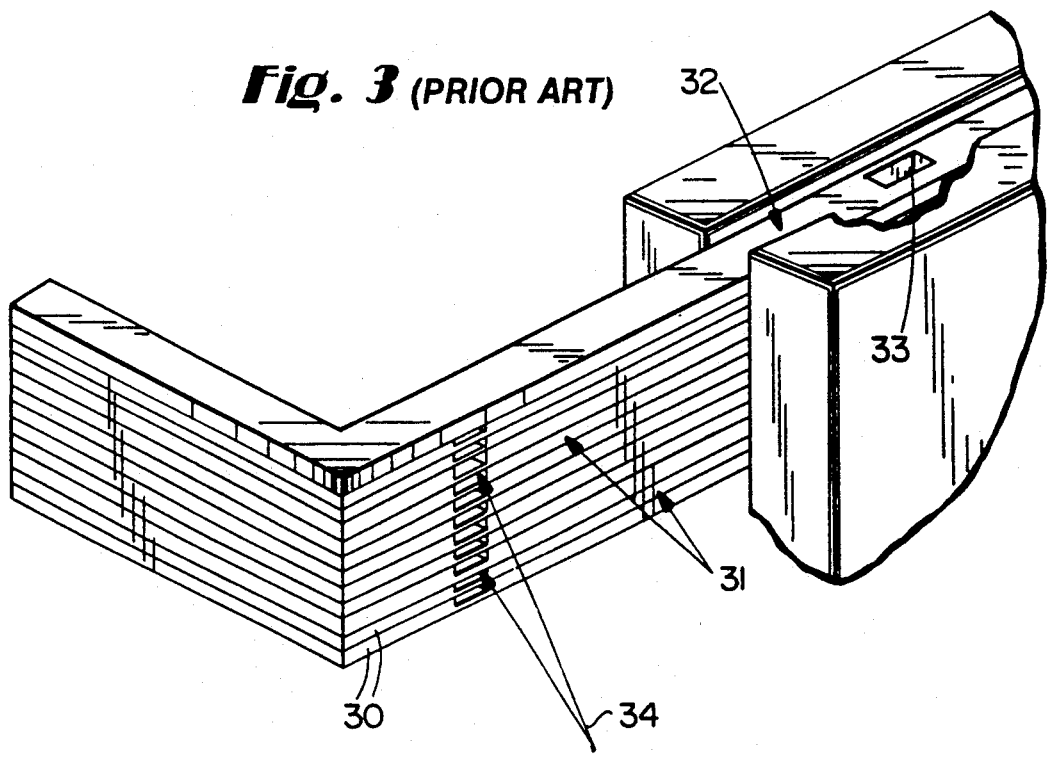
FIG. 3 is a partial view of a conventional rotor slot illustrating a conventional manner of forming rotor coil end turns.

As indicated in FIGS. 2 and 3, present conventional practice is to include only one coil per rotor slot with the turn conductors configured to occupy close to the full width of the slot. That is to say, sufficient clearance is allowed for the installation of the slot armor insulation, as well as that which is necessary for the installation of the turn conductors. For ventilation purposes, slots 33 of approximately one and one-half to two inches long and one-eighth inch wide are punched or machined into the turn conductors, as well as the turn insulation 31 between the conductors. Such slots 33 are spaced on approximately two to two and one-half inch centers and are aligned with similar openings in the creepage blocks and coil wedges to form radial ventilation passages. Such slot turn conductors are conventionally formed into coils by brazing straight rectangular copper sections to the ends of the slot turn conductors. The coils are inserted into the slots after brazing and cleaning along with strips of turn insulation 31 placed between each of the conductors.

Clearly, where the slot armor requires replacement due to damage during installation of the coils or other causes, replacement of the slot armor insulation would require removing the coil. Additionally, the use of full width coils dictates away from winding the coils in place with a long length of conductor since such construction would require additional steps of pressing and/or grinding to eliminate localized increases or upsets in the cross section areas of the bends.

Figure 4:
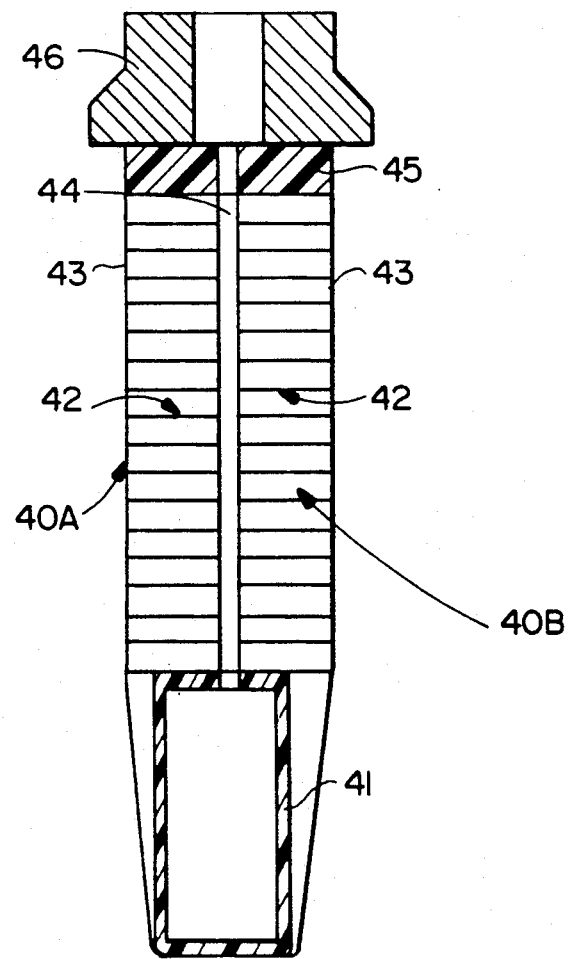
FIG. 4 is a cross-sectional view of a rotor slot incorporating two wound coils in accordance with an exemplary embodiment of my invention.

As illustrated in FIG. 4, for example, I have designed a "twin turn" or two coils per slot configuration. Each of the two coils 40A and 40B, as illustrated in the drawing, form two stacks of turn conductors in each of the rotor slots. The coils are supported by a plurality of non-metallic subslot support members 41. Although only one such support member is illustrated, it is contemplated that in a conventional rotor having a length of 22 inches, a single such support member, approximately two inches in length, may be used at the rotor ends along with a third such coil support midway along the length of the rotor slot. Additional such supports may be added as needed depending upon the design and dimensions of the dynamoelectric machine.

The individual turns of each coil are insulated from each other through the use of turn insulation 42 which may comprise strips of resin filled glass weave or similar material which are 10 to 14 mils thick. The coil conductors are additionally insulated from the steel rotor forging through the use of two relatively straight insulating slot armor elements 43, which generally conform to the shape of the rotor slot sidewalls.

After the coils 40A and 40B are formed in the rotor slots, the two stacks of turn conductors are separated by approximately an eighth of an inch by insulating spacers 44 that are driven between the separate coils. Such separation serves to electrically insulate the coils 40A and 40B from each other. Additionally, in the axial direction a plurality of such spacers are used which are approximately one-half inch wide and are placed on four to six inch centers in the general manner illustrated in FIG. 6. In this manner, radial ventilation passages are formed between the central coil sides of coils 40A and 40B and the spacers whereby coolant gas, such as air, enters the subslot through and around the hollow subslot support 41 in an axial direction and then through the above noted. radial ventilation passages, as well as the corresponding radial openings in the creepage block 45 and rotor slot wedge 46 to discharge into the air gap between the rotor and stator.

An advantage of the above noted-two coils per slot design is that in case the slot armor requires replacement, the central coil spacers 44 may be removed and the coils forced away from the slot armor elements 43. Thus, the disclosed design would allow the slot armor insulation elements to be removed and replaced without removing the coils from the slot. Moreover, with the insulating spacers 44 in place, no side clearance exists between the rotor forging, the slot armor elements and the coil turn conductors whereby heat transfer from the copper to the rotor steel will increase resulting in lower copper temperatures.

Figure 1:
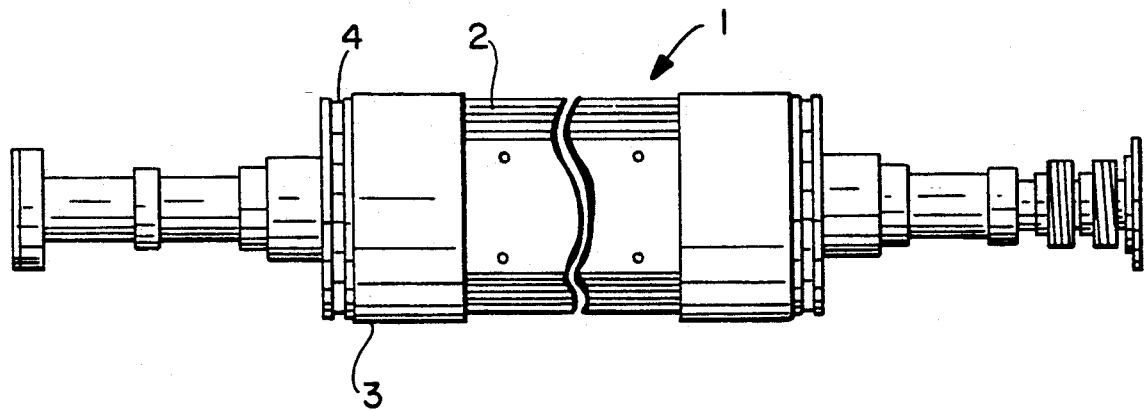
FIG. 1 illustrates the general details of a conventional dynamoelectric rotor according to the prior art.
Figure 5:
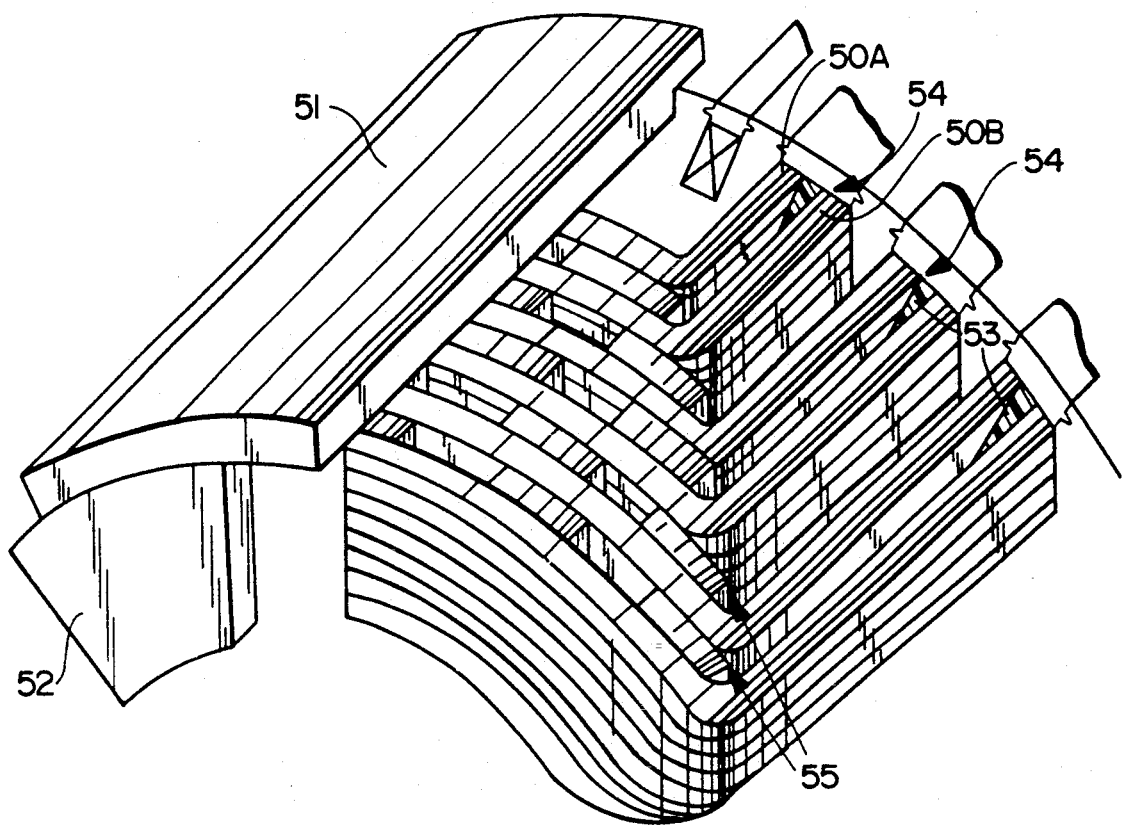
FIG. 5 is a partial perspective of an end view of the rotor slots and coil end winding configurations.

As illustrated in FIG. 5, since each coil turn conductor is approximately half the slot width, the coil turn conductors of coils 50A and 50B can be wound in place from long lengths of conductors with the illustrated end turns bent so as to be closely received within the rotor retaining ring 51 and the centering ring 52 that are conventionally included known rotor structures of the nature illustrated in FIG. 1. Such winding in place offers the advantage of eliminating the brazing and cleaning of the coil conductors as is conventional. Moreover, as aforementioned, if an insulating slot armor element is broken due to the stresses of winding the coil conductors in place, the armor element can be replaced prior to the insertion of the insulating separators 53 and wedges.

The insulating blocks 55 of FIG. 5 are used as spacers in the end turn regions of the windings. Such blocks are normally two to three inches wide and spaced from each other to provide free convection heat transfer from the end turns. The thus formed ventilation passages in combination with the use of two coils per slot substantially doubles the heat transfer surface area available for free convection. As will be appreciated by the artisan, if forced convection is necessary for still further heat transfer, sinusoidal ventilation passages may be formed by spacer blocks between the coils.

Figure 6:
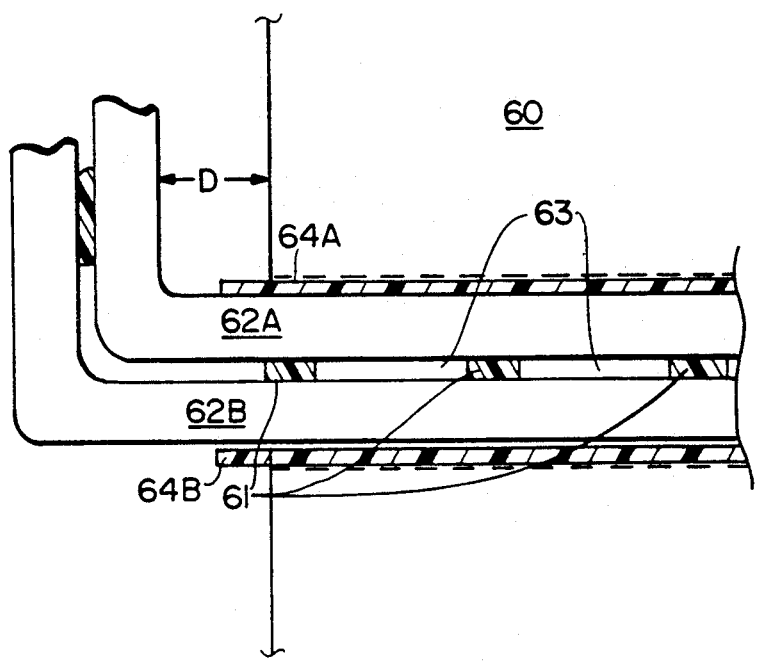
FIG. 6 is a top cross-sectional view of a rotor slot at a location below the dovetail wedge illustrating the placement of insulating coil spacers along the axial length of the rotor slots.

As illustrated in FIG. 6, which is a top view of a single slot in a rotor body with the dovetail wedge removed, the positioning and relative spacing of the insulated separators 61 between coil conductors 62A and 62B may be seen. As illustrated, the separators 61 are rectangular in cross section and may, for example, be approximately one-eighth inch thick and one-half inch wide. The length of the separators is sufficient to extend to the full depth of the coils. Moreover, the separators are spaced in the axial direction in such a manner as to be placed on four to six inch centers, thus forming radial ventilation passages 63.

Additionally, slot armor elements 64A and 64B are partially illustrated in FIG. 6. As will be noted, these elements extend out of the slot (usually one-half to three-quarters of an inch) for electrical creepage. As previously noted, the ability to install the slot armor elements in the slot sides adjacent to the poles after the coils are in place allows the distance "D" between the ends of the forging 60 and the number one coil illustrated as 62A to be reduced. Conventionally, three or more inches are required to insert the turns lowest in the stack into the slot in order to avoid breaking the slot armor element adjacent the pole where it extends out of the slot. With the present design the distance "D" could be reduced about two inches on each end. For a conventional generator of about 22 inches in length, such reductions in the distance "D" represent a substantial portion of the active machine length.

As will be appreciated by the artisan from a review off FIGS. 4 through 6, after the spacers are driven in place, no side clearance exists, and the eliminated clearance increases the size of the ventilation passages. Alternatively, the side clearance may be replaced with copper, thus resulting in a better slot fill factor. Still further, for the same number of turns in the slot, as in a prior art device, the volume of turn insulation for the two coils in the slot is reduced from that which is required for a single coil in each slot. Still further, where the coils are wound in place and formed by bending, as illustrated in FIG. 5, for example, since the conductors are approximately half the width of the prior art turn conductors, much less upset occurs, thus eliminating the need for grinding at the corners of a bend. Additionally, where the coil turns are wound in place, the end turns are insulated from each other through the use of coil space blocks 55, as shown in FIG. 5. For increased surface area exposed to coolant gases and thus higher heat transfer characteristics, the coil space blocks 55 may be replaced with winding separators similar to elements 53 as used in the slots. The use of such separators along with winding the half width conductors in place will advantageously lead to a reduction in the extension of the end turns beyond the rotor ends.

While the invention has been described with respect to what is presently regarded as the most practical embodiment thereof, it will be understood by those of ordinary skill in the art that various alterations and modifications may be made which nevertheless remain within the scope of the invention as defined by the claims which follow.

What is claimed is:

1. Rotor winding apparatus for use in a dynamoelectric machine including a rotor having axially extending slots for receiving conductive windings, said slots including insulating slot armor elements along axially directed sidewalls of said slots, said rotor winding apparatus comprising;
   a first winding in each of said rotor slots, said winding including a stack of conductors, each of said conductors having substantially equal cross sectional areas and with insulation between each adjacent conductor, said first winding being positioned adjacent one of said insulating armor elements on a first sidewall of said slots;
   a second winding in each of said rotor slots, said winding including a stack of conductors, each of said conductors having substantially equal cross sectional areas and with insulation between each adjacent conductor, said second winding being positioned adjacent another one of said insulating armor elements on a second sidewall of said slots;
   a plurality of insulating spacers between said first and second windings in each of said slots, said spacers being distributed axially along each said slot such that said spacers and said first and second windings form radial ventilation passages, and
   said rotor slots include subslots positioned below said windings for providing coolant gas flow to said radial ventilation passages so that said coolant gas flow directly contacts said conductors for enhanced heat transfer from said conductors to the coolant has flow.

2. Rotor winding apparatus as in claim 1 wherein said rotor slots, said slot armor elements, said windings and said spacers are dimensioned such that no clearance space exists between said slot sidewalls and said armor elements and between the windings and said armor elements and so that the conductors to slot fill factor is maximized.

3. Rotor winding apparatus as in claim 1 further including means in each said subslot for supporting said windings in the slots.

4. Rotor winding apparatus as in claim 1 wherein said windings are formed from continuous lengths of conductors which are bent to form end windings connecting the winding conductors of one of said slots with the winding conductors of another of said slots.

5. Rotor winding apparatus as in claim 1 wherein said insulation between each adjacent conductor comprises strips of resin filled glass weave material.

6. In a dynamoelectric machine having a metal rotor with a plurality of axially extending slots, each slot including first and second radially extending sides, insulating armor sheets axially extending along said first and second radially extending sides of each said slot, the improvement comprising:

first and second windings in each of said slots, said windings each including a stack of conductors, said first winding being positioned adjacent one of said insulating armor sheets n said first radially extending side of each said slot, and said second winding being positioned adjacent another of said insulating armor sheets on said second radially extending side of each said slot;

radially extending insulating spacers driven between said first and second windings for insulating said windings in each of said slots from each other and for forcing said windings against said insulating armor sheets and said armor sheets against said slot sides;

said spacers including a plurality of separate spacer elements separated from each other along the axially extending slots;

said windings and said spacer elements forming a plurality of radially directed ventilation passages in each said slot;

said slots including subslots positioned below said windings for providing coolant gas flow to said ventilation passages so that the coolant gas flow directly contacts said conductors for enhanced heat transfer from said conductors to the coolant gas flow; and said windings are formed of continuous lengths of conductors which are bent to form end windings connecting the winding conductors of one of said slots with the winding conductors of another of said slots.

7. The dynamoelectric machine of claim 6 wherein each of said slots includes a axially extending wedge located adjacent to an air gap between said rotor and a stator of said machine and wherein the wedge includes openings therethrough connecting said ventilation passages with said air gap so that said coolant gas flow discharges into said air gap.

* * * * *